United States Patent
Parker et al.

[15] 3,679,731
[45] July 25, 1972

[54] ACRYLOXY ESTERS OF ANHYDRIDES

[72] Inventors: Gordon M. Parker, Harwick; Marco Wismer, Gibsonia; Ernest A. Hahn, Pittsburgh, all of Pa.

[73] Assignee: PPG Industries, Inc., Pittsburgh, Pa.

[22] Filed: July 9, 1969

[21] Appl. No.: 840,524

[52] U.S. Cl.................260/475 P, 117/93.3, 117/93.31
[51] Int. Cl..............................................C07c 69/76
[58] Field of Search....................................260/475 P

[56] References Cited

UNITED STATES PATENTS

| | | |
|---|---|---|
| 3,367,992 | 2/1968 | Bearden..................260/475 |
| 3,432,478 | 3/1969 | May.......................260/475 |
| 3,451,980 | 6/1969 | Brownstern..............260/475 |

*Primary Examiner*—Lorraine A. Weinberger
*Assistant Examiner*—E. Jane Skelly
*Attorney*—Chisholm and Spencer

[57] ABSTRACT

This invention relates to acryloxy(or methacryloxy)alkyl(or alkyloxyalkyl) acryloxy(or methacryloxy)hydroxyalkyl organic polycarboxylic esters prepared by reacting an organic acid anhydride selected from the group consisting of trimellitic anhydride and pyromellitic anhydride with a hydroxyalkyl acrylate or methacrylate and then reacting this half-ester with a glycidyl acrylate or methacrylate. These compounds are useful in coating compositions and particularly coating compositions curable by radiation.

9 Claims, No Drawings

ACRYLOXY ESTERS OF ANHYDRIDES

The fact that certain unsaturated monomers and polymers are susceptible to polymerization and crosslinking by various forms of radiation such as light, especially ultraviolet light, electron beams and nuclear radiation, has been known in the art for many years. Recently the use of various forms of radiation in the polymerization and crosslinking of coating compositions has become of increased commercial interest to the coatings industry. One of numerous methods advanced in the art is set forth in U.S. Pat. No. 3,247.012.

It has now been found that compounds corresponding to the formulas:

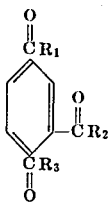

where (A) one of $R_2$ or $R_3$ is

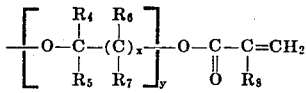

where

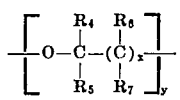

contains two to 10 carbon atoms, $x$ being a whole number from 1 through 9, $y$ being a whole number from 1 through 5 and where $R_4$, $R_5$, $R_6$ and $R_7$ are selected from the group consisting of hydrogen and lower alkyl;

B. where the remaining $R_1$ or $R_2$ and $R_3$ are selected from the group consisting of -OH and

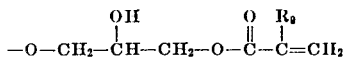

with at least one of these groups and preferably both being

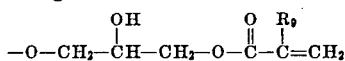

C. where $R_8$ and $R_9$ are selected from the group consisting of hydrogen and methyl, preferably hydrogen; and (II)

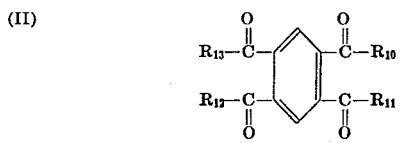

where (D) one of $R_{10}$ and $R_{11}$ and one of $R_{12}$ and $R_{13}$ are

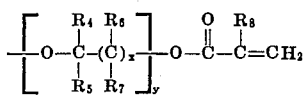

as defined in (A) supra;

E. where the remaining $R_{10}$ or $R_{11}$ and the remaining $R_{12}$ and $R_{13}$ are selected from the group consisting of

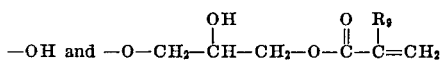
—OH and with at least one of these groups and preferably both being

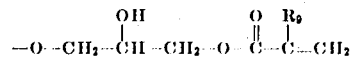

F. where $R_8$ and $R_9$ are selected from the group consisting of hydrogen and methyl, preferably hydrogen, produce excellent radiation-curable coating compositions.

The above compounds are prepared by reacting, in a first stage, an organic acid anhydride selected from the group consisting of trimellitic and pyromellitic anhydrides with a hydroxyalkyl acrylate or methacrylate to form a half-ester. The resultant half-ester is then reacted with a glycidyl acrylate or methacrylate in a second stage to form the hydroxyl-containing unsaturated compounds of the formulas above.

The hydroxyalkyl acrylate or methacrylate which may be employed in the first stage reactions includes any hydroxyalkyl acrylate of the formula:

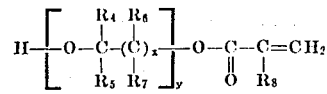

where $R_4$, $R_5$, $R_6$ and $R_7$ are selected from the group consisting of hydrogen and lower alkyl and $R_8$ is selected from the group consisting of hydrogen and methyl, preferably hydrogen, and where $x$ is a whole number from 1 through 9 and $y$ is a whole number from 1 through 5, the group

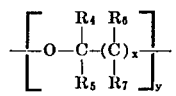

containing from two to 10 carbon atoms.

Specific examples of such compounds include; hydroxyethyl acrylate, hydroxyethyl methacrylate, hydroxypropyl acrylate, hydroxypropyl methacrylate, hydroxyethoxyethyl acrylate, hydroxypropoxypropyl acrylate.

The glycidyl compound which may be used in the second stage is selected from the group consisting of glycidyl acrylate and glycidyl methacrylate.

The compounds of the invention include:
2-acryloxyethyl 3-acryloxy-2-hydroxypropyl trimellitic acid dicarboxylate
2-acryloxyethyl bis(3-acryloxy-2-hydroxypropyl) trimelletic acid tricarboxylate
2-methacryloxyethyl 3-methacryloxy-2-hydroxypropyl trimellitic acid dicarboxylate
2-methacryloxyethyl bis(3-methacryloxy-2-hydroxypropyl) trimellitic acid tricarboxylate
3-acryloxypropyl bis(3-acryloxy-2-hydroxypropyl)trimellitic acid tricarboxylate
2-acryloxypropyl 3-acryloxy-2-hydroxypropyl trimellitic acid dicarboxylate
2(2-acryloxyethoxy)ethyl bis(3-acryloxy-2-hydroxypropyl) trimellitic acid tricarboxylate
3(3-acryloxypropoxypropoxy) propyl bis(3-acryloxy-2-hydroxypropyl) trimellitic acid tricarboxylate
3(3-acryloxypropoxypropoxy)propyl 3-acryloxy-2-hydroxypropyl trimellitic acid dicarboxylate
Bis(2-acryloxyethyl) 3-acryloxy-2-hydroxypropyl pyromellitic acid tricarboxylate
Bis (2-acryloxyethyl bis(3-acryloxy-2-hydroxypropyl) pyromellitic acid tetracarboxylate
Bis(2-methacryloxyethyl) 3-methacryloxy-2-hydroxypropyl pyromellitic acid tricarboxylate
Bis(2-methacryloxyethyl) bis(3-methacryloxy-2-hydroxypropyl) pyromellitic acid tetracarboxylate
Bis(3-acryloxypropyl) bis(3-acryloxy-2-hydroxypropyl) pyromellitic acid tetracarboxylate
Bis(3-acryroxypropyl) 3-acryloxy-2-hydroxypropyl pyromellitic acid tricarboxylate
Bis[2(2-acryloxyethoxy)ethyl] bis(3-acryloxy-2-hydroxypropyl) pyromellitic acid tetracarboxylate
Bis[3(3-acryloxypropoxypropoxy)propyl] bis(3-acryloxy-2-hydroxypropyl) pyromellitic acid tetracarboxylate Bis[3(3-acryloxypropoxy)propyl] 3-acryloxy-2-hydroxypropyl pyromellitic acid tricarboxylate As previously stated, the process for preparing the compounds of this invention is a two-stage process.

The first stage is conducted by charging the organic acid anhydride and hydroxyl acrylic compound into a reaction vessel and mixing to open the anhydride ring to form a half-ester.

The temperature at which the ring opening may be conducted can be varied widely; however, the reaction proceeds at room temperature. Preferably, the reaction mixture is heated, usually to between about 70° C and 120° C., although temperatures as high as 150° C. or higher may be employed, depending on the stability of the reactants or the acceptability of lower yield due to side reactions.

The proportion of the reactants is not critical; however, to obtain maximum conversion with maximum purity, a mole ratio approximating 1:1, for example a mole ratio between about 0.7:1 and about 1.3:1 is desirable in the case of trimellitic anhydride. In the case of pyromellitic anhydride, since two anhydride groups are present, a mole ratio of approximately 2:1 (hydroxyl compound to anhydride) is reacted, for example, a mole ratio of about 1.7:1 to about 2.3:1. The anhydride may be present in molar excess without substantial reaction. Molar excesses of the hydroxy compound speed the reaction without greatly reducing the yield and molar excesses of 2 have been commonly employed.

The reaction may be conducted in bulk, or, if desired, in the presence of an inert aromatic or polar organic material solvent, such as, for example, dimethyl formamide, a polyethylene glycol dimethyl ether, ketones, toluene, xylene and the like.

The first stage reaction is usually conducted in the absence of a catalyst; however, if desired, a catalyst for anhydride ring opening may be employed.

The second stage reaction is conducted by adding the glycidyl compound to the product of the first stage reaction. while it is possible to conduct the reaction by mixing the reactants, it is desirable to add the glycidyl compound incrementally so as to better control the reaction and to obtain higher yields of the desired product.

The amount of glycidyl compound employed will determine whether one or both of the remaining carboxyl groups and the trimellitic or pyromellitic half-esters are reacted, and conversely, whether free carboxyl groups remain.

Again, in the second stage, the proportions of the reactants are not critical; however, to obtain maximum conversion with maximum purity, a mole ratio of approximately 1.1, for example in the range of about 0.7:1 to about 1.3:1 moles is desirable in the case where a free carboxyl is desired and about 2:1, e.g., 1.7:1 to 2.3:1, in the case where both carboxyl groups are reacted. The half-ester may be present in a molar excess without substantial reaction. Molar excesses of the glycidyl compound may reduce the yield; however, excesses of less than two moles will still produce the desired product.

While the reaction is usually conducted in bulk, it is possible to conduct the second stage reaction in the presence of an aromatic or inert polar solvent such as described above.

The temperature at which the second stage reaction is conducted is subject to wide variation. While the reaction proceeds at room temperature, it is desirable to heat the reaction mixture, usually to a temperature of about 70° C. to about 130° C. Temperatures as high as 150° C. or higher may be employed, depending on the stability of the reactants and products employed; however, these higher temperatures tend to increase side reactions and therefore reduce the yield of desired product.

While the use of a catalyst is not essential in the second stage reaction, it is desirable to employ an amine catalyst such as N-methyl morpholine.

Since the process has at least one reactant in each step containing polymerizable unsaturation, it is desirable, although not absolutely necessary, to employ an inhibitor in the reaction mixture, for example, a quinone, a hydroquinone, or a phenolic inhibitor of the type conventionally employed with unsaturated acrylic-type monomers. Examples of inhibitors include quinone, hydroquinone, methyl quinone and methyl hydroquinone and the dimethyl ether of hydroquinone.

The compounds hereinabove disclosed are particularly useful in the preparation of coating compositions which may be cured by ionizing radiation, that is, UV light, electron beams and nuclear radiation.

The particular method used to coat the substrate is not critical as any conventional coating technique may be used. For instance, spraying, roller coating, curtain coating, and many other well-known methods may be used. Using the monomers of the present invention, it is preferable to apply the coating using a roller coater to achieve thin uniform coatings.

The term "irradiation," as used herein, means high energy radiation and/or the secondary energies resulting from conversion of this electron or other particle energy to neutron or gamma radiation, said energies being at least equivalent to about 100,000 electron volts. While various types of irradiation are suitable for this purpose, such as X-ray and gamma and beta rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is not upper limit to the electron energy that can be so applied advantageously, the effects desired in the practice of this invention can be accomplished without having to go to above about 20 million electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "radiation," which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alphaparticles, deuterons, beta-particles, or their analogs, directed in such a way that the particle is projected into the mass to be irradiated. Charged particle can be accelerated by the aid of voltage gradients by such devices as accelerators with resonance chambers, Van der Graaff generators, betatrons, synchrotons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive material.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type traveling wave accelerator, Model Mark I, operating at 3 to 10 million electron volts; such as supplied by High Voltage Engineering Corporation, Burlington, Massachusetts, or other types of accelerators as described in U.S. Pat. No. 2,763,609 and in British Pat. No. 762,953 are satisfactory for the practice of this invention.

The monomers described herein will cure acceptably using any total dosage between about 1 megarad and about 20 megarads. A "rad" is defined as that amount of radiation required to supply 100 ergs per gram of material being treated and a megarad is $10^6$ rads. The total dosage is the total amount of irradiation received by the coating or film. The rate of irradiation is generally not believed to be important as the total dosage is believed to be the predominant factor in the curing of the monomers.

The process of this invention is best carried out by applying a layer of from about one mil to about 25 mils thickness over a substrate and passing the coated substrate under electron beam irradiation at a certain line speed for a designated time. The particular space and time is not critical so long as the coated substrate is exposed to the irradiation for a time long enough to acquire a total dose of about one to about 20 megarads. The line speed used may be varied according to apparatus limitations; however, it is desirable that the line speed be fast enough so that the monomer mixture will not flow off the substrate during curing. It is noted that at a total dosage of less than one megarad there is generally insufficient polymerization of the monomers and at a total dosage exceeding about 20 megarads there is generally some waste of energy. The preferred range for the total dosage is between about one megarad and 10 megarads. The irradiation is preferably carried out in an inert atmosphere, such as nitrogen gas.

The compounds per se when in liquid form are susceptible to polymerization to form coatings or shaped articles. However, the compounds of the invention may likewise be admixed with other monomers in order to control viscosity and other application variables such as rate of cure as well as final film properties such as hardness and flexibility. The presently preferred monomer utilized to control viscosity is butyl acrylate. Other reactive monomers, in addition to acrylic and methacrylic acid, include acrylic or methacrylic esters of alkanols containing from about 4 to about 18 carbon atoms. The acrylic monomers generally have the formula:

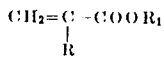

where R is selected from the group consisting of H and $CH_3$ radicals and $R_1$ is an alkyl radical having from four to 18 carbon atoms. The alkyl radical $R_1$ may be branched or straight chain radical. Examples of these monomers are butyl acrylate, butyl methacrylate, 2-ethylhexyl acrylate, lauryl acrylate, amyl methacrylate, n-octyl acrylate, isooctyl acrylate, isodecyl methacrylate, 2,4,4-trimethyl-2-pentyl acrylate, 2,4,4-trimethyl-2-pentyl methacrylate, methyl acrylate, ethyl acrylate, isobutyl acrylate, 2-ethylhexyl acrylate, isobutyl methacrylate, hydroxyethyl acrylate, hydroxypropyl acrylate, t-butylaminoethyl acrylate, stearyl methacrylate, silane methacrylate, butyl cellosolve acrylate, cyclohexyl acrylate, n-decyl acrylate, n-decyl methacrylate, 2-ethoxy methacrylate, 2-ethylhexyl methacrylate, octadecyl acrylate, oleyl methacrylate, tetrahydropyranyl methacrylate, tridecyl methacrylate, 2,2,4-trimethyl pentane diol isobutyrate, 3-methacrylate, and the like.

In addition to the acrylic monomers, the monomer mixtures utilized contain one or more functional monomers which are compatible with the above-described acrylic monomers. These monomers are ethylenically unsaturated monomers containing a reactive functional group and are added to the acrylic monomers to modify the resultant coating and to incorporate crosslinking sites. The preferred modifying monomers have the formula:

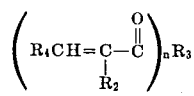

where $R_2$ is selected from the group consisting of H and $CH_3$ and $R_3$ is selected from the group consisting of OH; $NH_2$;

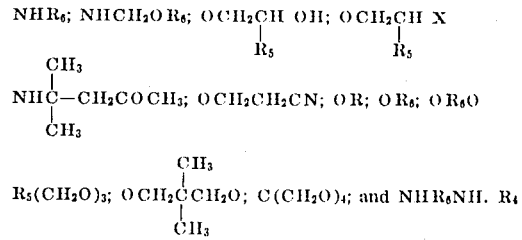

in selected from from the group consisting of H, $COOR_5$, COOH, and $CONHR_5$ and $R_5$ is selected from the group consisting of chlorine, fluorine and bromine, $R_6$ is hydrocarbyl or halohydrocarbyl and n is a whole number from 1 to 4.

Examples of the unsaturated monomers having functional groups which are the preferred modifying functional monomers are N-butoxymethyl acrylamide; N-butoxymethyl methacrylamide; diethylene glycol diacrylate, 2-hydroxyethyl acrylate; 2-cyanoethyl acrylate; acrylic acid, diacetone acrylamide; 2-acryloxyethyl hydrogen maleate, 2-acryloxyethyl hydrogen phthalate; 2-acryloxyethyl hydrogen succinate; 2-methacryloxyethyl hydrogen maleate; 2-cyanoethyl hydrogen maleate; 2-acryloxyethyl hydrogen chlorendate; N-t-butylacrylamide; N-isopropyl acrylamide; N-(2,4,4-trimethyl-2-pentyl)acrylamide; 2-hydroxypropyl acrylate; 2-hydroxybutyl acrylate; ethyl hydrogen maleate; ethyl hydrogen fumarate, and the like. Others include 1,3-butylene glycol diacrylate; 1,4-butane diol diacrylate; 1,4-butane diol dimethacrylate; 1,10-decamethylene glycol dimethacrylate, diallyl itaconate; diethylene glycol dimethacrylate; glyceryl trimethacrylate; 1,6-hexane diol diacrylate; 1,6-hexane diol methacrylate; 2,2-dimethyl propane diacrylate (neopentyl glycol diacrylate); 2,2-dimethyl propane dimethacrylate (neopentyl glycol dimethacrylate); polyethylene glycol (200) diacrylate; tetraethylene glycol diacrylate; triethylene glycol diacrylate; 3,5,5-trimethylhexyl acrylate; 3,5,5-trimethylhexyl methacrylate (isononyl methacrylate); 2,2,4-trimethyl-1,3-pentane diol dimethacrylate; trimethylol propane diallyl ether monomethacrylate; tripropylene glycol dimethacrylate; trimethylol propane triacrylate; and the like.

Any one or combination of two or more of the above functional monomers may be included in the mixture of monomers.

It is often desirable to add small amounts of a thickening agent to increase the viscosity of the monomer mixture and to facilitate the application of the monomer mixture to a substrate. The preferred thickening agents are relatively high molecular weight polymeric materials. By "high molecular weight" is meant molecular weights which are greater than about 20,000. When present, the polymeric thickening agents generally comprise up to about 30 percent by weight of the mixture to be subjected to the ionizing irradiation but are preferably present in an amount of from about 3 to about 30 percent by weight of the mixture. Examples of these thickening agents are neoprene rubbers, butyl rubbers, styrene-butadiene rubbers, nitrile rubbers, poly(ethylene), poly(propylene), copolymers of ethylene and vinyl esters or ethers, poly(alkyl acrylates), poly(alkyl methacrylates), polyesters such as poly(ethylene maleate), poly(propylene fumarate), poly(propylene phthalate), and the like.

Other types of thickening agents may also be used to good advantage. These include finely divided silica, alumina, and the like.

A particularly useful formation has been found to comprise 75 percent of 2-acryloxyethyl bis(3-acryloxy-2-hydroxypropyl) trimellitic acid tricarboxylate, 15 percent butyl acrylate and 10 percent 1,4-butandiol diacrylate. This formation showed stain resistance, excellent adhesion to hardboard and excellent gloss and color retention as a clear coating (1 mil film thickness) when cured by an electron beam of 300-500 KV with a total dose of 3-4 megarads.

In the above and similar formations, the 2-acryloxyethyl bis(3-acryloxy-2-hydroxypropyl) trimellitic acid tricarboxylate may be replaced by any compound of the invention as set forth above to obtain a use coating composition which may be radiation cured.

The compounds of the invention and formulations containing them are relatively dose rate independent within practical limits. Generally, a total dose of 3—4 megarads is sufficient to cure coatings containing the compounds of the invention. However, total doses as high as 20 megarads or even many fold higher do not appear to have a detrimental effect on the film. Obviously, however, economical consideration dictates the lowest total dose necessary to cure the films, which amount may readily be determined.

The amount of compound as defined above which may be employed in the coating composition of the invention ranges from 100 percent to 5 percent, the remainder being radiation-active monomers or diluents such as monomer-soluble inert or reactive polymers.

For ease of application and curing, the above composition should be chosen with this in mind.

For speed of cure and quality of the cured film, it is highly preferable that the curing of the above compositions be carried out in an inert atmosphere such as nitrogen, helium, argon, etc.

There are set forth below several examples which illustrate the method of producing the compounds of the invention and their use in coating compositions. These examples are, of course, given by way of illustration only and should not be constructed as limiting the invention to the particular details thereof. All parts and percentages set forth, as is true throughout the specification, are by weight unless otherwise specified.

EXAMPLE I

Into a reactor were charged 116 parts of hydroxyethyl acrylate containing 0.1 part hydroquinone. This mixture was heated to 80° C. and there was then added gradually 96 parts of trimellitic anhydride. The reaction mixture was then heated to 90°-100° C. for 2½ hours. The reaction mixture was then heated to a temperature of 110° C. and 128 parts of glycidyl acrylate containing 0.1 part of n-methyl morpholine were added dropwise, the temperature of the reaction mixture being maintained at 110° C. for one-half hour after the addition was completed. The final reaction mixture contained compounds of the formula:

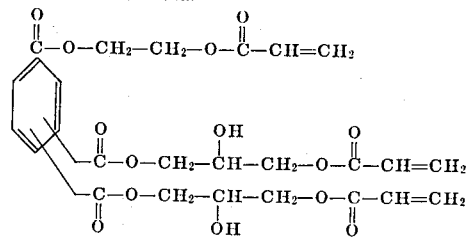

in approximately 75 percent yield.

EXAMPLE II

Into a reactor were charged 466 parts of hydroxyethyl acrylate containing 0.4 parts of hydroquinone; this mixture was heated to 80° C. and there was then gradually added 218.1 parts of pyromellitic anhydride. The reaction mixture was then heated to 100° C. and 256 parts of glycidyl acrylate containing 0.4 part of n-methyl morpholine were added dropwise.

The temperature of the reaction mixture was maintained at 110° C. for one hour after addition was complete.

There was obtained in approximately 85 percent yield:

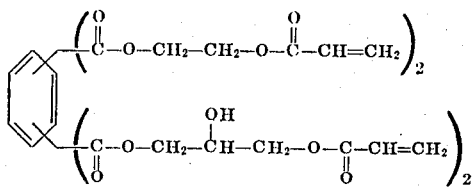

EXAMPLE III

The following resin samples were cured on hardboard under nitrogen atmosphere by passing 3 mil wet samples under a 350 KV electron beam. The total dose in each case was 2.65 megarads.

| | COMPOSITION | REMARKS |
|---|---|---|
| A. | 50 parts product of Ex. I | hard cured solvent-resistant coating |
| | 8 parts ethyl acrylate | |
| B. | 50 parts product of Ex. II | hard cured solvent-resistant coating |
| | 7 parts ethyl acrylate | |

Similar results are obtained by substituting the corresponding starting materials to produce the other compound enumerated. Likewise, the compounds shown in the working examples may be replaced by other compounds within the scope of the invention to achieve equivalent results.

According to the provisions of the patent statutes, there are described above the invention and what are now considered to be its best embodiments. However, within the scope of the appended claims, it is to be understood that the invention can be practiced otherwise than as specifically described.

We claim:

1. A compound corresponding to the formula:

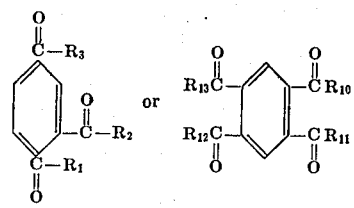

where (A) one R within each of the pairs $R_1$ and $R_2$ ; $R_{10}$ and $R_{11}$; and $R_{12}$ and $R_{13}$ is

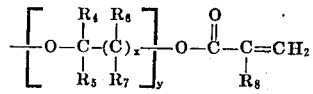

where

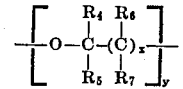

contains two to 10 carbon atoms, $x$ being a whole number from 1 to 9, $y$ being a whole number from 1 through 5 and $R_4$, $R_5$, $R_6$, and $R_7$ are selected from the group consisting of hydrogen and lower alkyl;

B. $R_3$ and the remaining R's in pairs, $R_1$ and $R_2$, $R_{10}$ and $R_{11}$ and $R_{12}$ and $R_{13}$ are selected from the group consisting of hydroxyl and

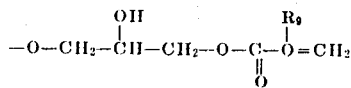

at least one of $R_1$, $R_2$, and $R_3$ and at least one of $R_{10}$, $R_{11}$, $R_{12}$ and $R_{13}$ being

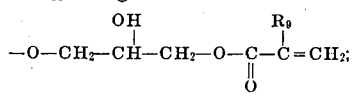

and

C. $R_8$ and $R_9$ being selected from the group consisting of hydrogen and methyl.

2. The compound as in claim 1 wherein $R_8$ and $R_9$ are hydrogen.

3. The compound as in claim 2 wherein $y$ is 1.

4. The compound as in claim 3 wherein $R_4$, $R_5$, $R_6$ and $R_7$ are hydrogen.

5. The compound as in claim 1 wherein in (B) $R_3$ and the remaining R's in the pairs $R_1$ and $R_2$, $R_{10}$ and $R_{11}$, and $R_{12}$ and $R_{13}$ are all

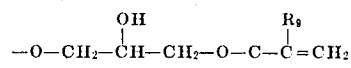

6. The compound as in claim 5 wherein $R_8$ and $R_9$ are hydrogen.

7. The compound as in claim 5 wherein $y$ is 1.

8. The compound as in claim 5 wherein $R_4$, $R_5$, $R_6$ and $R_7$ are hydrogen.

9. A compound as in claim 1 wherein $x$ is 1 or 2, $R_4$, $R_5$, $R_6$ and $R_7$ are hydrogen, and $y$ is a whole number between 1 and 30

* * * * *

UNITED STATES PATENT OFFICE
CERTIFICATE OF CORRECTION

Patent No. 3,679,731          Dated July 25, 1972

Inventor(s) Gordon M. Parker, Marco Wismer and Ernest A. Hahn

It is certified that error appears in the above-identified patent and that said Letters Patent are hereby corrected as shown below:

Claim 1, Column 8, line 69, "B." should read ---(B)---

Claim 1, Column 8, line 72, the portion of the formula reading $$\overset{R_9}{-O=}$$ should read $$\overset{R_9}{-C=}$$

Claim 1, Column 9, line 8, "C." should read ---(C)---

Claim 5, Column 10, line 7, the portion of the formula reading "$-O-C-C=\overset{R_9}{}$"

should read $$-O-\underset{\underset{O}{\|}}{C}-C=\overset{R_9}{}$$

Claim 9, column 10, line 14, "30" should read ---3.---

Signed and sealed this 23rd day of January 1973.

(SEAL)
Attest:

EDWARD M. FLETCHER, JR.　　　　　ROBERT GOTTSCHALK
Attesting Officer　　　　　　　　Commissioner of Patents